US010233939B2

(12) United States Patent
De Gaillard et al.

(10) Patent No.: US 10,233,939 B2
(45) Date of Patent: Mar. 19, 2019

(54) AVIATION TURBINE ENGINE FAN ASSEMBLY INCLUDING A FITTED PLATFORM

(71) Applicant: SAFRAN AIRCRAFT ENGINES, Paris (FR)

(72) Inventors: Thomas Alain De Gaillard, Massy (FR); Alexandre Bernard Marie Boisson, Moissy-Cramayel (FR); Audrey Laguerre, Alfortville (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 425 days.

(21) Appl. No.: 15/205,265

(22) Filed: Jul. 8, 2016

(65) Prior Publication Data
US 2017/0097009 A1 Apr. 6, 2017

(30) Foreign Application Priority Data

Jul. 8, 2015 (FR) ...................... 15 56458

(51) Int. Cl.
*F04D 29/34* (2006.01)
*F04D 19/00* (2006.01)
(Continued)

(52) U.S. Cl.
CPC ........... *F04D 29/34* (2013.01); *F01D 5/3007* (2013.01); *F01D 5/323* (2013.01); *F01D 11/008* (2013.01);
(Continued)

(58) Field of Classification Search
CPC .......... F01D 5/30; F01D 5/3007; F01D 5/323; F01D 11/006; F01D 11/008;
(Continued)

(56) References Cited

U.S. PATENT DOCUMENTS

| 5,281,096 A * | 1/1994 | Harris .................. F01D 11/008 |
| | | 416/193 A |
| 6,447,250 B1 * | 9/2002 | Corrigan ............... F01D 5/3007 |
| | | 416/193 A |

(Continued)

FOREIGN PATENT DOCUMENTS

| EP | 2 837 774 A1 | 2/2015 |
| FR | 2 988 426 A1 | 9/2013 |
| WO | WO 2015/076900 A2 | 5/2015 |

OTHER PUBLICATIONS

Search Report as issued in French Patent Application No. 1556458, dated Apr. 26, 2016.

*Primary Examiner* — Richard Edgar
*Assistant Examiner* — Elton Wong
(74) *Attorney, Agent, or Firm* — Pillsbury Winthrop Shaw Pittman LLP

(57) ABSTRACT

A fan assembly for an aviation turbine engine, the assembly including a fan disk having at least one tooth and at least one platform mounted on the tooth of the fan disk, the platform including a box of composite material made from fiber reinforcement densified by a matrix, the box having a flow passage wall, a bottom wall, and two side walls extending radially between the bottom wall and the flow passage wall. The box of the platform includes an upstream opening at an upstream end of the platform and a downstream opening, and the assembly also includes a locking key housed in the box and passing through the upstream and downstream openings of the box, the locking key being blocked at each of its ends by a blocking element.

10 Claims, 4 Drawing Sheets

(51) Int. Cl.
  *F04D 29/64* (2006.01)
  *F04D 29/02* (2006.01)
  *F02K 3/06* (2006.01)
  *F01D 11/00* (2006.01)
  *F01D 5/30* (2006.01)
  *F01D 5/32* (2006.01)

(52) U.S. Cl.
  CPC .............. *F02K 3/06* (2013.01); *F04D 19/002* (2013.01); *F04D 29/023* (2013.01); *F04D 29/646* (2013.01); *F05D 2220/36* (2013.01); *F05D 2260/31* (2013.01)

(58) Field of Classification Search
  CPC ...... F04D 19/002; F04D 29/023; F04D 29/34; F04D 29/646; F05D 2220/36; F05D 2240/80; F02K 3/06
  See application file for complete search history.

(56) References Cited

U.S. PATENT DOCUMENTS

| | | | |
|---|---|---|---|
| 6,634,863 B1 | 10/2003 | Forrester et al. | |
| 2008/0226458 A1* | 9/2008 | Pierrot | F04D 29/321 416/220 R |
| 2015/0125305 A1* | 5/2015 | Duelm | F04D 29/023 416/193 A |
| 2016/0252103 A1* | 9/2016 | Hubbert | F01D 5/3053 416/220 R |
| 2017/0030205 A1* | 2/2017 | Brown | F01D 5/30 |

* cited by examiner

AVIATION TURBINE ENGINE FAN ASSEMBLY INCLUDING A FITTED PLATFORM

CROSS-REFERENCE TO RELATED APPLICATIONS

This application claims priority to French Patent Application No. 1556458, filed Jul. 8, 2015, the entire content of which is incorporated herein by reference in its entirety.

FIELD

The present invention relates to the general field of aviation turbine engines, and more particularly to the field of fitted platforms for fan blades of an aviation turbine engine.

BACKGROUND

In a turbine engine, fitted platforms for fan blades need to perform several functions. From an aerodynamic point of view, such platforms have the main function of defining the air flow passage. They must also be capable of withstanding large forces without deforming and while remaining secured to the disk that carries them.

In order to satisfy these various requirements, certain configurations have been proposed in which platforms possess a first portion serving to define the air flow passage and to retain the platform while the engine is rotating, and a second portion serving to limit deformation of the first portion under the effect of centrifugal forces and to hold the platform in position when the engine is stopped.

In existing solutions, the platform may be in the form of a box with a two-dimensional flow passage wall that is held downstream by a drum and upstream by a shroud, the shroud being held upstream over the tooth of the fan disk (a flange of the shroud serving to block the upstream end of the platform both axially and radially).

Such upstream retention performed over the tooth of the disk with a shroud presents the drawback of imposing a large hub ratio, where the hub ratio is the ratio of the radius measured between the axis of rotation and the point on the leading edge of the blade that is flush with the surface of the platform divided by the radius measured between the axis of rotation and the outermost point of the leading edge.

In order to optimize the performance of the fan, and more generally of the turbine engine, it is desirable to have an assembly comprising a platform that is fitted to the fan blade mounted on a fan disk that presents a hub ratio that is as small as possible.

SUMMARY

An aspect of the present invention thus provides a fan assembly for an aviation turbine engine, the assembly comprising a fan disk having at least one tooth and at least one platform mounted on the tooth of the fan disk, the platform comprising a box of composite material made from fiber reinforcement densified by an organic matrix, the box having a flow passage wall, a bottom wall, and two side walls extending radially between the bottom wall and the flow passage wall.

In accordance with the invention, the box of the platform includes an upstream opening at an upstream end of the platform and a downstream opening, and the assembly also includes a locking key housed in the box and passing through the upstream and downstream openings of the box, the locking key being blocked at each of its ends by blocking means.

This assembly, in which it is possible to use any type of fitted platform for a turbine engine fan, providing it includes a box, makes it possible to reduce the hub ratio by providing the platform with radial retention by means of the locking key. The dimensioning of the locking key enables the hub ratio to be modified depending on requirements. More precisely, a reduction in the thickness of the locking key, particularly at its upstream end, enables the hub ratio to be reduced.

Also, the use of the locking key makes it possible to take advantage of the box structure of the platform, since the key makes it possible to distribute forces over a greater area of the bottom wall of the box. This better distribution of forces makes it possible to reduce the thickness of the side walls of the box of the platform, and consequently to reduce the weight of the assembly. To further improve this distribution of forces, the locking key may present a width in a transverse direction of the platform that is substantially equal to the inside width of the box, i.e. to the distance between the side walls of the box.

Also, since the box is made of an organic matrix composite material comprising fiber reinforcement densified by a matrix, these forces (mostly in traction) are transferred into the side walls of the box along the reinforcing fibers, thereby further improving the mechanical strength of the platform.

Finally, the number of parts needed for mounting such an assembly is reduced by using the locking key. In embodiments, the bottom wall may present a horizontal portion extending parallel to the tooth of the disk between the upstream and downstream openings, the horizontal portion possibly being in contact with the locking key continuously over its entire length. The horizontal portion of the bottom wall may bear against the tooth of the disk when the engine is stopped.

This arrangement provides better control over movements of the platform in the radial direction and over its entire length, thereby making it possible, in operation, to avoid any modification to the streamlined air inlet flow passage into the turbine engine. Also, when the platform presents a chord length that is long, the continuous contact between the locking key and the bottom wall of the box serves to avoid the flow passage wall of the platform deforming radially in its central portion.

In an embodiment, the blocking element for blocking the locking key at its downstream end is a hook projecting from the tooth of the fan disk.

Also in an embodiment, the assembly further includes an upstream shroud, the locking key being blocked at its upstream end by means of said upstream shroud.

Under such circumstances, the locking key may present at its upstream end a folded portion extending radially along an upstream face of the tooth of the fan disk, the folded portion having passing therethrough a fastener element for mounting the upstream shroud on the fan disk. Also, in certain embodiments of the invention, the folded portion of the locking key is extended by an axial portion positioned under the tooth of the fan disk.

In other embodiments of the invention, the upstream end of the locking key is locked in a housing formed in the upstream shroud.

Beneficially, the bottom wall of the box is pierced by an opening passing a hook projecting from the tooth of the fan disk, the hook being configured to have the locking key that is received in the box pass therethrough.

The locking key may be made of organic matrix composite material compromising fiber reinforcement densified by a matrix, or in a variant it may be made of a metal or a metal alloy.

The locking key may be a plane bar or a cylindrical rod.

An aspect of the invention also provides an aviation turbine engine fan comprising such an assembly as described above, wherein the fan disk presents at least two teeth defining between them a slot, and at least one blade provided with a root mounted in the slot of the fan disk.

Finally, an aspect of the invention also provides a method of mounting an assembly as presented above, the method comprising:

bringing the platform to the tooth of the fan disk in a substantially radial direction;

inserting the locking key into the box of the platform via the upstream opening of the box; and blocking the ends of the locking key by blocking means.

BRIEF DESCRIPTION OF THE DRAWINGS

Other characteristics and benefits of the present invention appear from the following description made with reference to the accompanying drawings, which show implementations having no limiting character. In the figures.

DETAILED DESCRIPTION

In the present description, the terms "longitudinal", "transverse", "lower", "upper", and their derivatives are defined relative to the main direction of the platform under consideration; the terms "radial", "tangential", "inner", "outer", and their derivatives are defined relative to the main axis of the turbine engine; and finally, the terms "upstream" and "downstream" are defined relative to the flow direction of the fluid passing through the turbine engine. Also, unless specified to the contrary, the same reference signs in the various figures designate the same characteristics.

Figure 1:
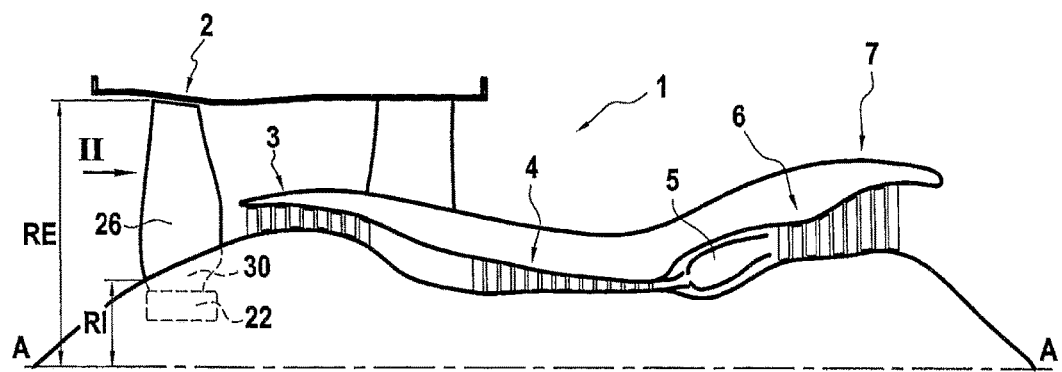
FIG. 1 is a diagrammatic section view of a turbine engine of an embodiment of the invention.

FIG. 1 shows a diagrammatic longitudinal section view of a bypass turbojet 1 of the invention centered on the axis A-A. It comprises, from upstream to downstream: a fan 2, a low-pressure compressor 3, a high-pressure compressor 4, a combustion chamber 5, a high-pressure turbine 6, and a low-pressure turbine 7.

Figure 2:
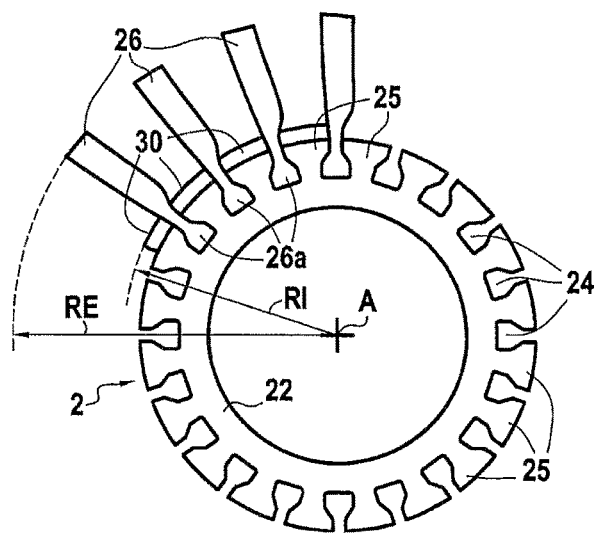
FIG. 2 is a diagrammatic view of the FIG. 1 fan seen along a direction II.

FIG. 2 shows a diagrammatic view of the FIG. 1 fan 2 seen along direction II. The fan 2 of the present invention comprises a fan disk 22 having a plurality of slots 24 formed therein in its outer periphery. The slots 24 are rectilinear and they extend axially from upstream to downstream all along the disk 22. They are also regularly spaced apart all around the axis A-A of the disk 22. In this way, each slot 24 co-operates with a neighbouring slot to define a tooth 25 that likewise extends axially from upstream to downstream all along the disk 22. In equivalent manner, a slot 24 is defined between two neighbouring teeth 25.

The fan 2 also has a plurality of blades 26 of curvilinear profile (only four blades 26 are shown in FIG. 2). Each blade 26 possesses a root 26a that is mounted in a respective slot 24 of the fan disk 22. For this purpose, the root 26a of a blade 26 may be in the form of a Christmas tree or in the form of a dovetail that matches the shape of the slots 24.

Finally, the fan 2 has a plurality of fitted platforms 30, each platform 30 being installed in the gap between two neighbouring fan blades 26, in the vicinity of their roots 26a, so as to define the inside of an annular air inlet passage into the fan 2, the passage being defined on the outside by a fan casing. FIGS. 1 and 2 show also an internal radius RI and an external radius RE. The internal radius RI corresponds to the radius measured between the axis of rotation A-A and the point of the leading edge of a blade 26 that is flush with the surface of a platform 30. The external radius RE corresponds to the radius measured between the axis of rotation A-A and the outermost point of the leading edge of a blade 26. These two radii RI and RE are those used for calculating the hub ratio RI/RE that the assembly of the invention proposes reducing (in particular by reducing the internal radius RI). In other words, reducing the hub ratio by acting in particular on the internal radius RI, amounts to bringing the air inlet flow passage as close as possible to the fan disk.

Figure 3:
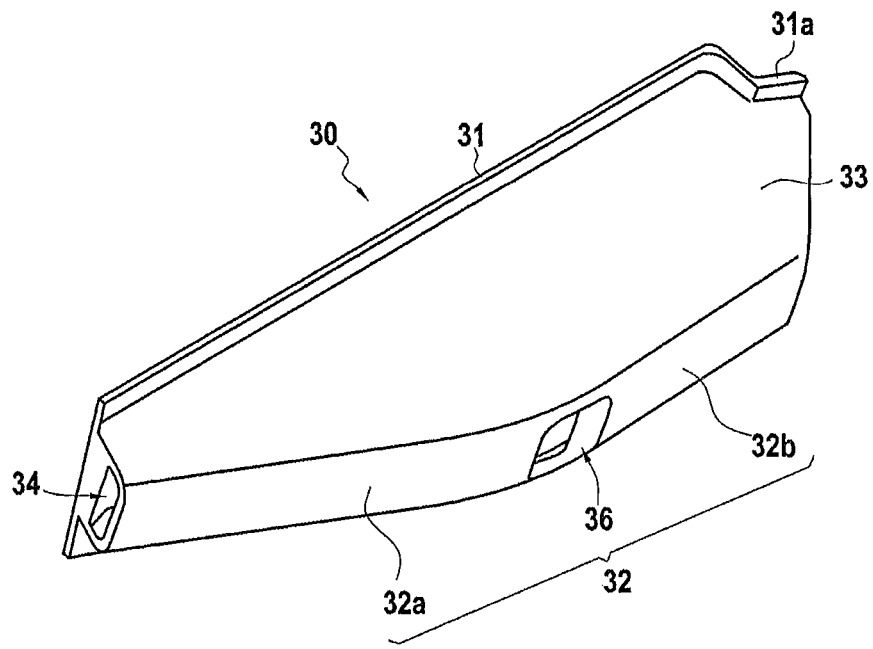
FIG. 3 is a diagrammatic perspective view of a platform for use in an aviation turbine engine assembly of an embodiment of the invention.

A platform 30 that is to be used in an assembly constituting an embodiment of the invention is shown in perspective in FIG. 3. The platform 30 is in the form of a box with a flow passage wall 31 forming the top or outside face of the platform 30 and having a sloping profile, a bottom wall 32 that enables the platform to stand on a tooth 25 of the disk 22 while the turbine engine is stopped, and two side walls 33 (only one of the two side walls is visible in FIG. 3) extending radially between the bottom wall 32 and the flow passage wall 31. The bottom wall 32 of the platform 30 has a horizontal portion 32a and a sloping portion 32b for the purpose of reducing the overall weight of the platform 30. In a variant, a box platform 30' likewise in accordance with the invention may present a bottom wall 32' (FIG. 5) that is plane and horizontal (i.e. parallel to the top surface of the tooth 25 of the disk). The horizontal portion 32a or the bottom wall 32' rests on the tooth 25 of the disk 22 and is in contact with the tooth 25 when the engine is stopped.

The platforms 30, 30' may be made in conventional manner out of organic matrix composite material comprising fiber reinforcement densified by a matrix.

At its upstream end, the platform 30 presents an upstream opening 34 that may be pierced in the box, for example. Also, the platform 30 additionally presents a downstream opening 36 at the junction between the horizontal portion 32a and the sloping portion 32b of the bottom wall 32. The downstream opening 36 may be pierced directly in the bottom wall 32. In a variant, the downstream opening 36' of the platform 30' (FIG. 5) may be constituted by the openwork portion 36' already present at the downstream end of the box of the platform 30', without requiring any additional hole to be pierced. In the examples shown, the upstream and downstream openings 34 and 36 are situated facing each other and radially at the same level. In other words, the upstream and downstream openings 34 and 36 are in horizontal alignment.

An assembly making use of the platform 30 as described above with reference to FIG. 3 is described below with reference to FIG. 4. This figure shows in greater detail a fan 2 in an embodiment of the invention.

Figure 4:
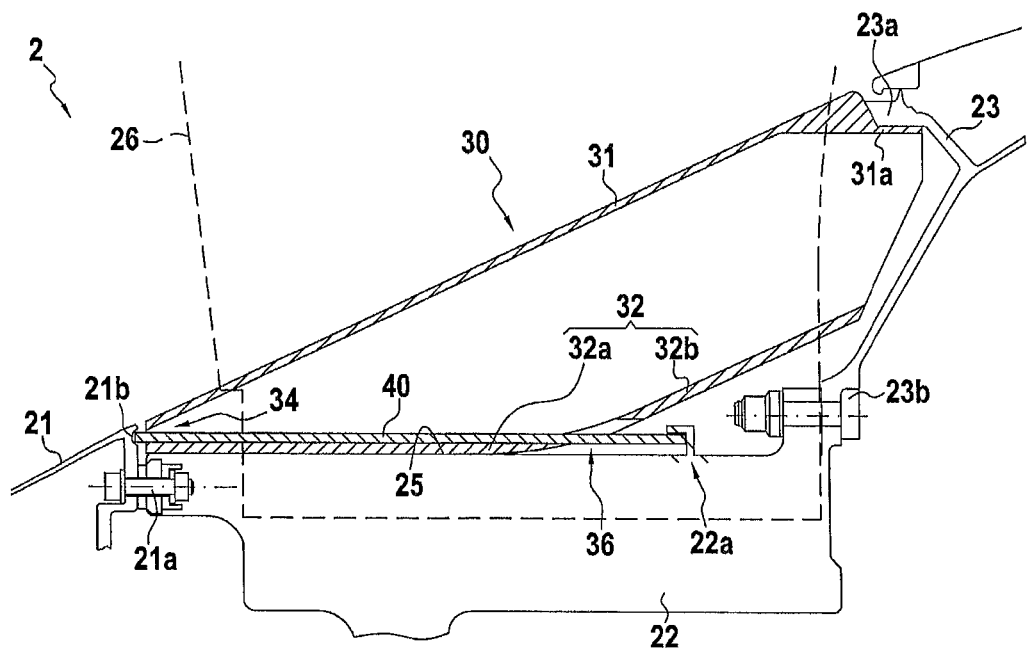
FIGS. 4 to 7 are longitudinal section views of assemblies in different embodiments of the invention.

In FIG. 4 there can be seen in particular a fan 2 comprising: an upstream shroud 21, a fan disk 22, and a downstream drum 23 (also referred to as a "booster" drum or "booster" shroud) having a retaining flange 23a for co-operating with an assembly step 31a at the downstream end of the platform 30. The downstream drum 23 is fastened to the fan disk 22 by means of fasteners 23b. The shroud 21 is fastened to the fan disk 22 by means of fasteners 21a.

The fan disk 22 is coupled to the drive shaft of the low-pressure turbine 7 of the turbine engine in such a manner that in operation the upstream shroud 21, the fan disk 22, the blades 26, and the downstream drum 23 are driven together in rotation by the low-pressure turbine 7. The platforms 30 are mounted between the upstream shroud 21 and the downstream shroud 23, they are held axially in position between these two elements, and they are thus likewise driven in rotation together therewith.

In accordance with the invention, the assembly also has a locking key 40 that, in this example, is in the form of a plane bar 40 housed in the box of the platform 30 and passing through the upstream opening 34 and the downstream opening 36 of the box, projecting a little at each end from the box. In this example, the bar 40 extends along the horizontal portion 32a of the bottom wall 32 while being in contact with the horizontal portion 32a of the box of the platform 30. In this configuration, the bar 40 extends parallel to the top surface of the tooth of the disk, i.e. horizontally. In this example, the distance over which the bar 40 and the horizontal portion 32a of the bottom wall 32 are in contact represents more than half of the distance between the upstream and downstream openings 34 and 36. In this example, contact between the bar 40 and the horizontal portion 32a is continuous between the upstream and downstream openings 34 and 36. This bar 40 provides uniform retention of the platform 30 along the horizontal portion of the bottom wall 32a running along the tooth 25 of the disk 22. The bar 40 may present a width in a direction perpendicular to the section plane of FIG. 4 that is substantially equal to the inside width of the box so as to further improve the distribution of forces within the platform 30.

The bar 40 may be made of organic matrix composite material, comprising fiber reinforcement densified by a matrix. In a variant, the bar 40 may be made of a metal or a metal alloy.

The downstream end of the bar 40 is blocked by a blocking element that, in this example, is in the form of a hook 22a projecting from the tooth of the disk towards its downstream end. Upstream, the bar 40 is blocked by the upstream shroud 21, which may also include a housing 21b for receiving the upstream end of the bar 40.

When the bottom wall of the box of the platform 30' is a simple horizontal wall 32' (FIG. 5), the bar 40 passes through the box via the upstream opening 34 and via the downstream opening 36' already present in the box, without requiring the bottom wall to be pierced as in the example of FIG. 4. In this example, the horizontal wall 32' is in contact with the bar 40 over its entire length and continuously between the upstream and downstream openings 34 and 36'.

Figure 5:
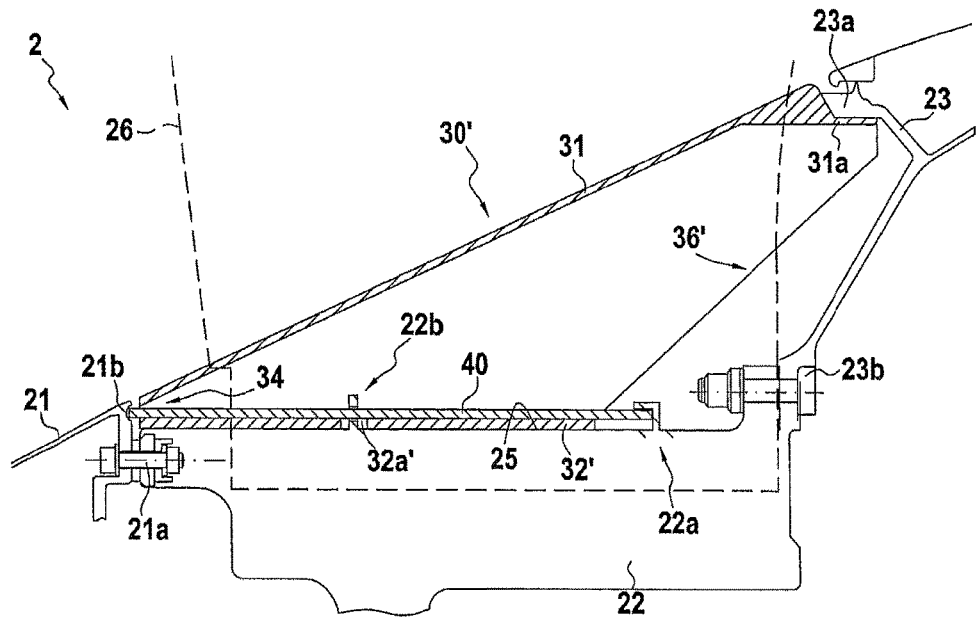

In the example assembly shown in FIG. 5, the bottom wall 32' of the box is pierced by an opening 32a' having passing therethrough a hook 22b that projects from the tooth 25 of the disk 22. The hook 22b is configured to have the bar 40 pass therethrough and to block it radially. As a result, additional retention is provided for holding the bar 40 against the tooth of the disk by means of the hook 22b. The hook 22b provides even better retention of the platform 30' and makes it possible to limit the bending of the bar 40 due to centrifugal forces while the turbine engine is in operation. Thus, the presence of this intermediate hook 22b makes it possible to reduce the thickness of the bar 40.

Figure 6:
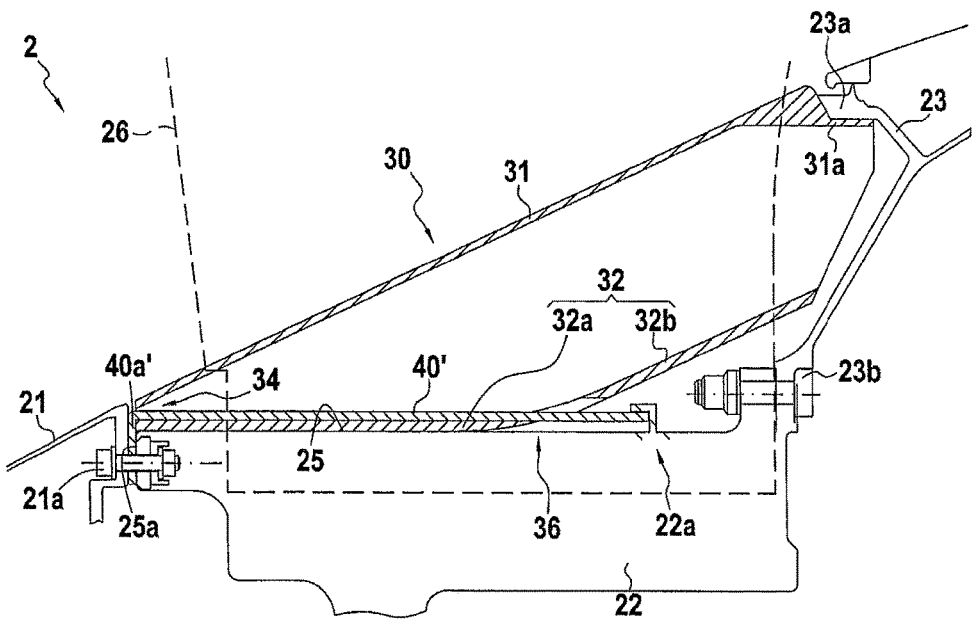

The example assembly shown in FIG. 6 differs from the above-described examples in that the bar 40' acting as the locking key presents a folded portion 40a' at its upstream end that extends radially along an upstream face 25a of the tooth 25 of the disk 22. The folded portion 40a' is pierced in order to pass the fastener element 21a for fastening the upstream shroud 21 on the fan disk 22.

Figure 7:
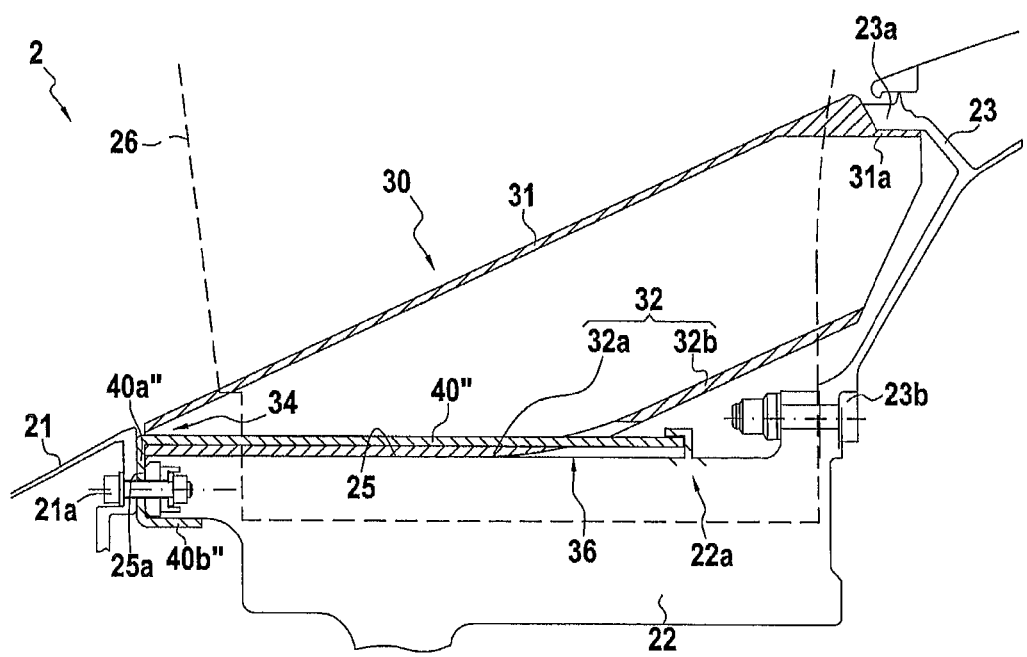

In FIG. 7, the bar 40" also presents a folded portion 40a" that is similar to the portion 40a' of the bar 40' of FIG. 6, and that is extended by an axial portion 40b" that is positioned under the tooth 25 of the disk 22. This configuration further improves the radial retention of the bar 40" and of the platform 30 on the disk.

Finally, in order to mount an assembly of the invention, the platform 30, 30' is initially brought along a substantially radial direction towards the tooth of the disk until the bottom wall 32', or at least its horizontal portion 32a, comes into contact with the tooth 25 of the disk 22 (care should also be taken to ensure that the flange 23a of the downstream drum 23 becomes placed on the assembly step 31a in the platform 30, 30'); thereafter the locking key 40, 40', 40" is inserted in the upstream opening 34 until it also passes through the downstream opening 36, 36' and comes into abutment against the hook 22a present on the tooth 25 (or a blocking element present on the downstream drum 23); and finally, the locking key 40, 40', 40" is blocked at its upstream end by fastening the upstream shroud 21 on the tooth 25.

It should be observed that the shape of the locking key 40, 40', 40" is not limited to a plane bar as in the above example, but it could have a variety of shapes, e.g. a cylindrical rod, or indeed a rod of semi-cylindrical shape. A plane bar makes it possible in particular to reduce the hub ratio, while a cylindrical rod would serve to distribute forces better at the bottom of the box and to provide a more uniform transition for forces. A rod of semi-cylindrical shape is a compromise between those two shapes for the locking key.

The invention claimed is:

1. A fan assembly for an aviation turbine engine, the assembly comprising a fan disk having at least one tooth and at least one platform mounted on the tooth of the fan disk, said platform comprising a box of composite material made from fiber reinforcement densified by an organic matrix, said box having a flow passage wall, a bottom wall, and two side walls extending radially between the bottom wall and the flow passage wall; wherein the box of the platform includes an upstream opening at an upstream end of the platform and a downstream opening, and the assembly also includes a locking key housed in the box and passing through the upstream and downstream openings of the box, said locking key being blocked at each of its ends by blocking means.

2. An assembly according to claim 1, wherein the blocking means for blocking the locking key at its downstream end is a hook projecting from the tooth of the fan disk.

3. An assembly according to claim 1, further comprising an upstream shroud, the locking key being blocked at its upstream end by means of said upstream shroud.

4. An assembly according to claim 3, wherein the locking key presents at its upstream end a folded portion extending radially along an upstream face of the tooth of the fan disk, said folded portion having passing therethrough a fastener element for mounting the upstream shroud on the fan disk.

5. An assembly according to claim 4, wherein the folded portion of the locking key is extended by an axial portion positioned under the tooth of the fan disk.

6. An assembly according to claim 3, wherein the upstream end of the locking key is locked in a housing formed in the upstream shroud.

7. An assembly according to claim 1, wherein the bottom wall of the box is pierced by an opening passing a hook projecting from the tooth of the fan disk, said hook being configured to have the locking key that is received in the box pass therethrough.

8. An assembly according to claim 1, wherein the locking key is a plane bar or a cylindrical rod.

9. An aviation turbine engine fan including an assembly according to claim 1, wherein the fan disk presents at least two teeth defining between them a slot, and at least one blade provided with a root mounted in the slot of the fan disk.

10. A method of mounting an assembly according to claim 1, the method comprising:
- bringing the platform to the tooth of the fan disk in a substantially radial direction;
- inserting the locking key into the box of the platform via the upstream opening of the box; and
- blocking the ends of the locking key by the blocking means.

\* \* \* \* \*